US006851111B2

(12) United States Patent
McGuire et al.

(10) Patent No.: US 6,851,111 B2
(45) Date of Patent: Feb. 1, 2005

(54) SYSTEM AND METHOD FOR CLASS LOADER CONSTRAINT CHECKING

(75) Inventors: Richard Kenneth McGuire, Boston, MA (US); Edward John Slattery, Winchester (GB); Matthew Alexander Webster, Hook (GB)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 09/738,469

(22) Filed: Dec. 15, 2000

(65) Prior Publication Data

US 2002/0129177 A1 Sep. 12, 2002

(51) Int. Cl.[7] ............................................... G06F 9/44
(52) U.S. Cl. ..................... 717/166; 717/116; 717/118; 717/148; 718/1; 719/331
(58) Field of Search ................................ 717/166, 116, 717/118, 148; 718/1; 719/331; 709/332, 316, 331; 707/1, 7, 103, 10

(56) References Cited

U.S. PATENT DOCUMENTS

| | | | | |
|---|---|---|---|---|
| 5,966,702 | A | * 10/1999 | Fresko et al. | ................ 707/1 |
| 6,430,569 | B1 | * 8/2002 | Bracha et al. | .......... 707/103 R |
| 6,618,769 | B1 | * 9/2003 | Bracha et al. | ............. 709/332 |
| 6,618,855 | B1 | * 9/2003 | Lindholm et al. | ......... 717/126 |
| 6,654,793 | B1 | * 11/2003 | Wollrath et al. | ............ 709/217 |
| 2002/0133643 | A1 | * 9/2002 | Bracha et al. | ............. 709/332 |

OTHER PUBLICATIONS

Chen, F.G. and Hou, Ting–Wei, "Design, and Implementation of a Java Execution Environment", Dec. 14–16, 1998, retrieved from IEEE database, Sep. 25, 2003.*
Goldberg, Allen, "A Specification of Java Loading and Bytecode Verification", p. 49–58, ACM 1998, retrieved from ACM Portal database Sep. 25, 2003.*
McManis, Chuck, "The basics of Java class loaders", 1996, retrieved from www.javaworld.com on Sep. 25, 2003.*

* cited by examiner

Primary Examiner—Antony Nguyen-Ba
Assistant Examiner—Mary Steelman
(74) Attorney, Agent, or Firm—Kudirka & Jobse, LLP (57) ABSTRACT

A computer system includes multiple class loaders for loading program class files into the system. A constraint checking mechanism is provided wherein a first class file loaded by a first class loader makes a symbolic reference to a second class file loaded by a second class loader, the symbolic reference including a descriptor of a third class file. The constraint mechanism requires that the first and second class files agree on the identity of the third class file and stores a list of constraints as a set of asymmetric relationships between class loaders. Each stored constraint, for a class loader which loaded a class file that contains a symbolic reference to another class file, includes a first parameter denoting the class loader which loaded the class file to which the symbolic references is made; and a second parameter denoting a class file which is identified by a descriptor in said symbolic reference.

13 Claims, 9 Drawing Sheets

SYSTEM AND METHOD FOR CLASS LOADER CONSTRAINT CHECKING

FIELD OF THE INVENTION

The present invention relates to object-oriented programs in which constraints are required to ensure the type consistency of loaded classes.

BACKGROUND OF THE INVENTION

Programs written in the JAVA programming language (JAVA is a trademark of Sun Microsystems Inc) are generally run in a virtual machine environment, rather than directly on hardware. Thus a JAVA program is typically compiled into byte-code form, and then interpreted by a JAVA virtual machine (JVM) into hardware commands for the platform on which the JVM is executing. The JVM itself is an application running on the underlying operating system. An important advantage of this approach is that JAVA applications can run on a very wide range of platforms, providing of course that a JVM is available for each platform.

JAVA is an object-oriented language. Thus a JAVA program is formed from a set of class files having methods that represent sequences of instructions (somewhat akin to subroutines). A hierarchy of classes can be defined, with each class inheriting properties (including methods) from those classes which are above it in the hierarchy. For any given class in the hierarchy, its descendants (i.e. below it) are called subclasses, whilst its ancestors (i.e. above it) are called superclasses.

At run-time classes are loaded into the JVM by one or more class loaders, which themselves are organised into a hierarchy. Objects can then be created as instantiations of these class files. One JAVA object can call a method in another JAVA object. In recent years JAVA has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

The standard JVM architecture is generally designed to run only a single application, although this can be multi-threaded. In a server environment used for database transactions and such-like, each transaction is typically performed as a separate application, rather than as different threads within an application. This is to ensure that every transaction starts with the JVM in a clean state. In other words, a new JVM is started for each transaction (i.e. for each new JAVA application). Unfortunately however this results in an initial delay in running the application (the reasons for this will be described in more detail later). The overhead due to this frequent starting and then stopping a JVM as successive transactions are processed is significant, and seriously degrades the scalability of JAVA server solutions.

Various attempts have been made to mitigate this problem. EP-962860-A describes a process whereby one JVM can fork into a parent and a child process, this being quicker than setting up a fresh JVM. The ability to run multiple processes in a JAVA-like system, thereby reducing overhead per application, is described in "Processes in KaffeOS: Isolation, Resource Management, and Sharing in Java" by G back, W Hsieh, and J Lepreau (see: http://www.cs.utah.edu/flux/papers/kaffeos-osdi00/main.html). Another approach is described in "Oracle JServer Scalability and Performance" by Jeremy Litzt, July 1999 (see: http:www.oracle.com/database/documents/jserver_scalability_and_performance_twp.pdf). The JServer product available from Oracle Corporation, USA, supports the concept of multiple sessions (a session effectively representing a transaction or application). Resources such as read-only bytecode information are shared between the various sessions, but each individual session appears to its client to be a dedicated conventional JVM.

U.S. patent application Ser. No. 09/304,160, filed 30 Apr. 1999 ("A long Running Reusable Extendible Virtual Machine"), assigned to IBM Corporation (IBM docket YOR9-1999-0170), discloses a virtual machine (VM) having two types of heap, a private heap and a shared heap. The former is intended primarily for storing application classes, whilst the latter is intended primarily for storing system classes and, as its name implies, is accessible to multiple VMs. A related idea is described in "Building a Java virtual machine for server applications: the JVM on OS/390" by Dillenberger et al, IBM Systems Journal, Vol 39/1, January 2000. Again this implementation uses a shared heap to share system and potentially application classes for reuse by multiple workers, with each worker JVM also maintaining a private or local heap to store data private to that particular JVM process.

One of the complications with extending the JVM in this manner relates to class loader type constraints. These type constraints identify type-safety relationships and are used to guarantee that a given named class will resolve to the same class object whenever there exists an interface dependency between two classes loaded by different class loaders. This is important in terms of the security of the JVM to prevent class spoofing (in which for example an attacker might try to supplant a system class with a rogue version to gain improper control of the JVM or application).

Thus according to the formal JAVA specification, it is possible that when two different class loaders L1, L2 initiate loading of a class or interface denoted by N, the name N may denote a different class or interface in each loader. In other words, the general rule in JAVA is that class name is unique to a given class loader, but not across the set of class loaders (or put another way, the combination of class name and class loader is unique).

However, in the situation where a class C (loaded by L1, say) makes a symbolic reference to a field or method of another class D (loaded by L2, say), the symbolic reference includes a descriptor specifying the type of the field, or the return and argument types of the method. (The type of a field can either be primitive, such as an integer, or else represent a class structure). Any type name N mentioned in the field or method descriptor must denote the same class or interface when loaded by L1 and when loaded by L2, otherwise the expected processing will not occur. In this situation, the same class implies the same class loader/class combination.

As an example of this, consider the following JAVA code (schematic only):

Class N1

```
{   public N f;
    public void test (N t)
    { ....... }
}
```

Class N2

```
{   public void fred ( )
    { N t;
    N1 a;
    a = new N1 ( );
    a.test (t)
    a.f.run ( )
    }
}
```

Class N

```
{   public void run ( )
    { .... }
}
```

In this example, Class N1 defines a variable f which is an object, and has type N (i.e. its format is effectively defined by class N). Class N1 further defines a method "test", which takes an argument also of type N. This method is public (i.e. accessible to other classes). Class N2 has a method "fred" which defines a variable t, again of type N, and a variable a of type N1. A new instance of the N1 class is then created and assigned to a, and then the test method in object a is called, passing variable t as a parameter. This is an example of one class making a symbolic reference to a method of another class. Note that it is important that the type definition of variable t as type N in class N1 has the same effect as the definition of variable t as type N in class N2, otherwise the argument passed into the method will not have the correct format.

Class N2 further contains an instruction to call a method "run" in class N, by referencing variable f in object a, where object a has type N1, and in N1 variable f has type N. This is an example where a class makes a symbolic reference to a field in another class, and again, it is important that in this situation class N1 and N2 both agree on the identity of class N, otherwise the field will not be properly structured. In other words, if N1 and N2 do not locate the same class N as loaded by the same class loader, then within the context of the JVM they are dealing with different classes.

To ensure that such agreement is achieved, loading constraints of the form $N^{L1}=N^{L2}$ are imposed by the JVM during the class loading procedure. Such a loading constraint is violated if, and only if, all four of the following conditions hold:

(a) a loader L1 has been recorded by the JVM as an initiating loader of a class C named $N^{L1}$;
(b) a loader L2 has been recorded by the JVM as an initiating loader of a class C' named $N^{L2}$;
(c) the set of imposed constraints implies $N^{L1}=N^{L2}$; and
(d) class C is not identical to class C'.

(There is an important distinction between the "initiating" loader and the "loading" loader. The "loading" loader is the one that actually creates a class. The initiating loader is the loader that was asked to resolve a class, and will typically first ask a parent loader if it is able to load a class before attempting to do it itself. For example, in a simple model with an application loader and the system loader, let us assume that a class Fred loaded by the application loader contains a reference to the class "java.lang.String". The class Fred requests that the class String be resolved by the loader that created it (i.e. the application loader). The application loader first asks the system loader if it is able to resolve the class "java.lang.String", which generally it will be able to do, as it has most likely been loaded already by this loader. In this scenario, the application loader is the "initiating" loader, as it initiated the load request. The system loader is the "loading" loader, since it physically loaded the String class. For class C to be equal to class C', we must have the same class name loaded by the same "loading" loader, since only this will guarantee uniqueness within the JVM.

In traditional JVMs, the constraint table is managed as a large global table, and constraints between class loaders are managed as if they were peer class loaders instead of having a parent-child relationship. A constraint entry in the table consists of the class name, a resolved class object, and a list of 2 or more class loader objects associated with the constraint. The constraint table may have multiple entries for a given class name, and occasionally, two constraint entries may need to be merged as the class loading hierarchy becomes more complicated.

When a new constraint is entered into the table, the class object field is initially unresolved (null). Then, when a class loader updates its internal class cache with a new class object, it first verifies the resolved class against the constraint table (the process of resolution is discussed in more detail later). If the constraint class is still unresolved, the loader will update the constraint entry with the resolved class object. If the constraint entry has already been resolved, then the resolved constraint class must match the class about to be added to the class cache.

This single table approach has a number of deficiencies. Creating and checking the constraints requires a lot of table searching. Adding or checking a constraint between two class loaders requires a search for the class in the class cache of each class loader, plus a search of the constraint table for each of the loaders. This search is performed every time a class name is encountered in a constraint-sensitive situation. For example, every method or field reference to the class java/lang/String in a class loaded by the application loader will perform this search for every occurrence of the class name. Because the loader constraint table entries are subject to merging and reallocation, it is not possible to maintain direct references to the loader cache entries.

In addition, constraints are tracked and maintained for non-dependent situations. If the two class loaders are peers in the class loading hierarchy, they cannot have cross loading relationships. However, the single table approach creates a constraint between the loaders whenever they have a common loading relationship that complicates the management process.

The algorithms do not scale very well on a multi-processor system. The complex updates required to the single constraint table require monitor protection for both reading and writing of the constraint information. Since there is a single table used for the entire JVM, this lock must lock out all other constraint resolution activity in the JVM. Likewise, the algorithms do not translate well to a shared classes environment as discussed above. Thus in a shared classes environment, type constraint relationships must hold true across all members of the JVM set. However, the type constraint tables resolve relationships between instances of class loaders, which may only exist in the local client JVM context. An algorithm that can efficiently incorporate the global constraint information into the local JVM context is desired, preferably once that involves as little cross-JVM locking as possible.

SUMMARY OF THE INVENTION

Accordingly, the invention provides an object-oriented computer system, including:

two or more class loaders for loading program class files into the system; and a constraint checking mechanism so that where a first class file loaded by a first class loader makes a symbolic reference to a second class file loaded by a second class loader, said symbolic reference including a descriptor of a third class file, the constraint enforces that the first and second class files agree on the identity of the third class file, said constraint checking mechanism including means for creating a data structure for recording a constraint as an asymmetric relationship between two class loaders, wherein said data structure includes, for a class loader which has loaded a class file that contains a symbolic reference to another class file, a first parameter denoting the class file which is identified by a descriptor in said symbolic reference, and a second parameter denoting the class loader which loaded said another class file.

The operation of such a mechanism involves identifying the need for a constraint between said first and second class loaders in respect of said third class file, and creating said data structure. In a preferred embodiment, the data structure comprises a first set of fields in the internal cache associated with the first class loader, and a second set of fields in the internal cache associated with the second class loader. A field is then set to point from the data structure fields for the first class loader to the data structure fields for the second class loader to identify the latter as being the constraint parent. Subsequently, when the first class loader attempts to resolve the third class, it is alerted to the existence of the relevant constraint by the pointer to the data structure fields for the second class loader.

The approach described herein improves efficiency through a reduction in the number of table searches, reduced storage requirements, and better locality of reference characteristics (i.e. constraints are stored associated with the relevant class loaders, rather than in one global table). This in turn leads to improved scalability in multi-processor environments, in that the removal of the single constraint table for the JVM allows both more granular locking of the data structures, as well as atomic style control block updates that remove the locking requirement for read access to cache control blocks. Furthermore, in the single table constraint approach, a requesting class loader needs to have awareness not only of both class loaders it was dependent upon, but also knowledge of what class loaders were also dependent on the requesting loader. Using this algorithm cache entries can make links to tables stored in memory shared between JVM instances without other JVMs needing to know of its existence.

BRIEF DESCRIPTION OF THE DRAWINGS

A preferred embodiment of the invention will now be described in detail by way of example only with reference to the following drawings.

DETAILED DESCRIPTION

Figure 1:
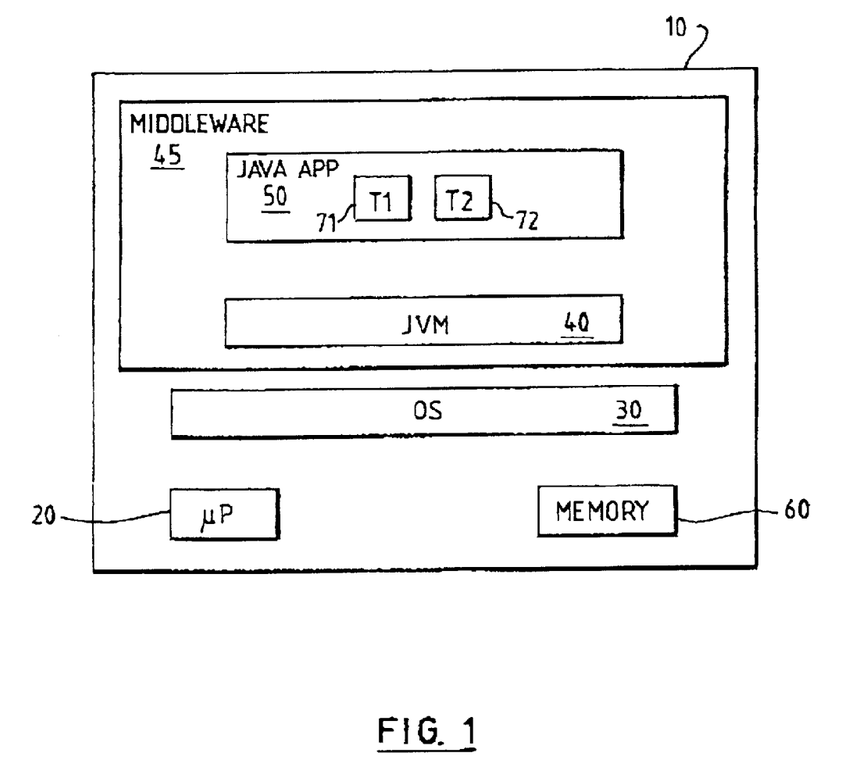
FIG. 1 shows a schematic diagram of a computer system supporting a JAVA Virtual Machine (JVM)

FIG. 1 illustrates a computer system 10 including a (micro)processor 20 which is used to run software loaded into memory 60. The software can be loaded into the memory by various means (not shown), for example from a removable storage device such as a floppy disk, CD ROM, or DVD, or over a network such as a local area network (LAN), telephone/modem connection, or wireless link, typically via a hard disk drive (also not shown). Computer system runs an operating system (OS) 30, on top of which is provided a JAVA virtual machine (JVM) 40. The JVM looks like an application to the (native) OS 30, but in fact functions itself as a virtual operating system, supporting JAVA application 50. A JAVA application may include multiple threads, illustrated by threads T1 and T2 71, 72.

System 10 also supports middleware subsystem 45, for example a transaction processing environment such as CICS, available from IBM Corporation (CICS is a trademark of IBM Corporation). The middleware subsystem runs as an application or environment on operating system 30, and initiates the JVM 40. The middleware also includes JAVA programming which acts to cause transactions as JAVA applications 50 to run on top of the JVM 40. In a typical server environment, multiple JVMs may be running on computer system 10, in one or more middleware environments.

It will be appreciated that computer system 10 can be a standard personal computer or workstation, network computer, minicomputer, mainframe, or any other suitable computing device, and will typically include many other components (not shown) such as display screen, keyboard, sound card, network adapter card, etc which are not directly relevant to an understanding of the present invention. Note that computer system 10 may also be an embedded system, such as a set top box, handheld device, or any other hardware device including a processor 20 and control software 30, 40.

Figure 2:
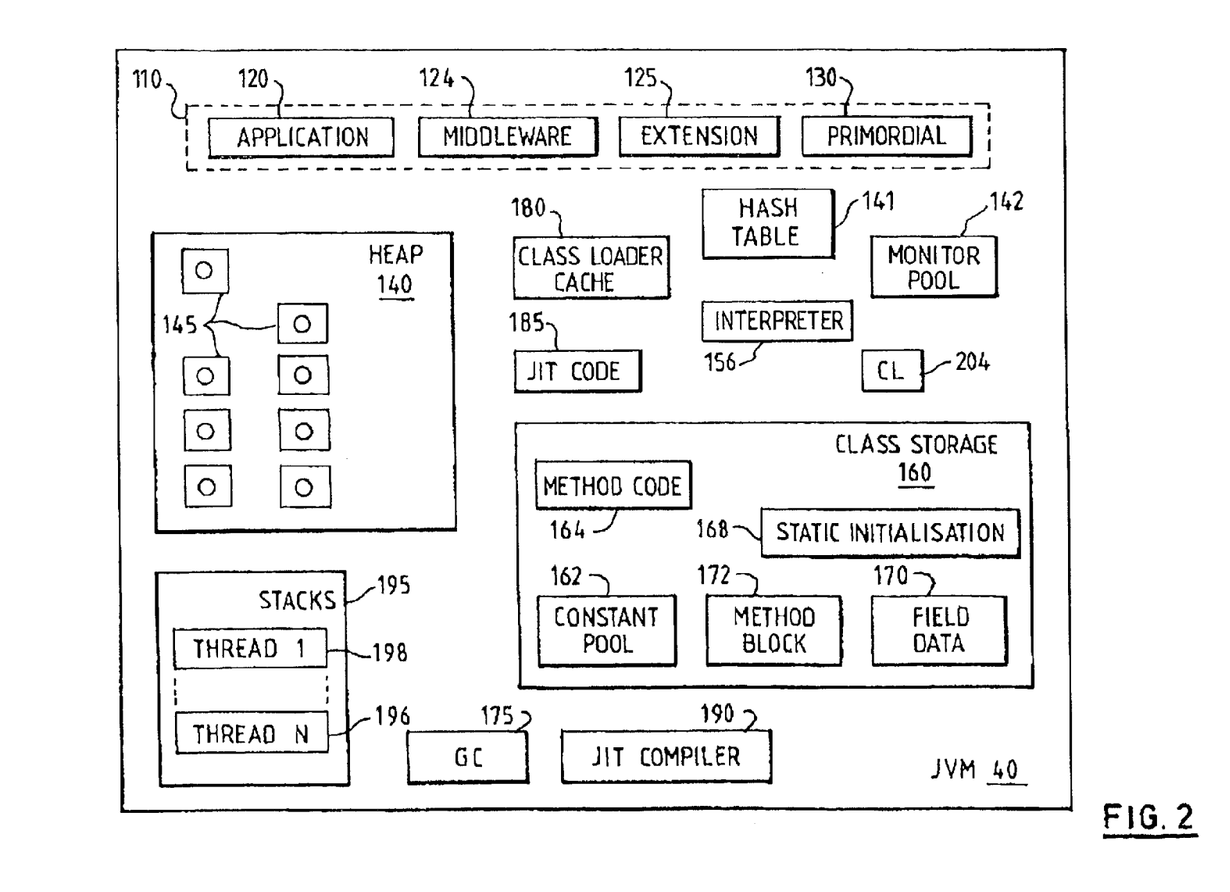
FIG. 2 is a schematic diagram of the internal structure of the JVM.

FIG. 2 shows the structure of JVM 40 in more detail (omitting some components which are not directly pertinent to an understanding of the present invention). The fundamental unit of a JAVA program is the class, and thus in order to run any application the JVM must first load the classes forming and required by that application. For this purpose the JVM includes a hierarchy of class loaders 110, which conventionally includes three particular class loaders, named Application 120, Extension 125, and Primordial 130. An application can add additional class loaders to the JVM (a class loader is itself effectively a JAVA program) hanging off from this hierarchy. In the embodiment illustrated, a fourth class loader is also supported, Middleware 124.

For each class included within or referenced by a program, the JVM effectively walks up the class loader hierarchy, going first to the Application class loader, then the Middleware loader, then the Extension class loader, and finally to the Primordial class loader, to see if any class loader has previously loaded the class. If the response from all of the class loaders is negative, then the JVM walks back down the hierarchy, with the Primordial class loader first attempting to locate the class, by searching in the locations specified in its class path definition. If this is unsuccessful, the Extension class loader then makes a similar attempt, if this fails the Middleware class loader tries. Finally, if this fails the Application class loader tries to load the class from one of the locations specified in its class path (if this fails, or if there is some other problem such as a security violation, the system returns an error). It will be appreciated that normally a different class path will be defined for each class loader.

The JVM further includes a component CL 204, which also represents a class loader unit, but at a lower level. In other words, this is the component that actually interacts with the operating system to perform the class loading on behalf of the different (JAVA) class loaders 110.

Also present in the JVM is a heap 140, which is used for storage of objects 145 (FIG. 2 shows the heap 140 only at a high level; see FIG. 5 below for more details). Each loaded class represents an object, and therefore can be found on the heap. In JAVA a class effectively defines a type of object, and this is then instantiated one or more times in order to utilise the object. Each such instance is itself an object which can be found in heap 140. Thus the objects 145 shown in the heap in FIG. 2 may represent class objects or other object instances. (Note that strictly the class loaders as objects are also stored on heap 140, although for the sake of clarity they are shown separately in FIG. 2). Although heap 140 is shared between all threads, typically for reasons of operational efficiency, certain portions of heap 140 can be assigned to individual threads, effectively as a small region of local storage, which can be used in a similar fashion to a cache for that thread.

The JVM also includes a class storage area 160, which is used for storing information relating to the class files stored as objects in the heap 140. This area includes a virtual method table (not shown) for associating inherited methods in the class with the relevant superclass, a method code region 164 for storing byte code for implementing class method calls, and a constant pool 162 for storing strings and other constants associated with a class. The class storage area also includes a field data region 170 for storing static variables (static in this case implies belonging to the class rather than individual instances of the class, or, to put this another way, shared between all instances of a class); and an area 168 for storing static initialisation methods and other specialised methods (separate from the main method code 164). The class storage area further includes a method block area 172, which is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc in class storage area 160. They also contain a reference to the class loader which loaded them into the heap, plus other fields such as a flag (not shown) to indicate whether or not they have been initialised.

FIG. 2 further shows a monitor pool 142. This contains a set of locks (monitors) that are used to control access to an object by different threads. Thus when a thread requires exclusive access to an object, it first obtains ownership of its corresponding monitor. Each monitor can maintain a queue of threads waiting for access to any particular object. Hash table 141 is used to map from an object in the heap to its associated monitor.

Another component of the JVM is the interpreter 156, which is responsible for reading in JAVA byte code from loaded classes, and converting this into machine instructions for the relevant platform. From the perspective of a JAVA application, the interpreter effectively simulates the operation of a processor for the virtual machine.

Also included within the JVM are class loader cache 180 and garbage collection (GC) unit 175. The former is effectively a table used to allow a class loader to trace those classes which it initially loaded into the JVM. The class loader cache therefore allows each class loader to check whether it has loaded a particular class—part of the operation of walking the class loader hierarchy described above. Note also that it is part of the overall security policy of the JVM that classes will typically have different levels of permission within the system based on the identity of the class loader by which they were originally loaded. Logically there is one class loader cache per class loader, although as a matter of implementation detail these may be combined in practice into a single storage structure. Further details of information stored with the class loader cache for the purpose of enforcing class loader type constraints are given below.

Garbage collection (GC) facility 175 is used to delete objects from heap 140 when those objects are no longer required. Thus in the JAVA programming language, applications do not need to specifically request or release memory, rather this is controlled by the JVM. Therefore, when JAVA application 50 creates an object 145, the JVM secures the requisite memory resource. Then, when JAVA application 50 finishes using object 145, the JVM can delete the object to free up this memory resource. This latter process is known as garbage collection, and is generally performed by briefly interrupting all threads 71, 72, and scanning the heap 140 for objects which are no longer referenced, and hence can be deleted. The garbage collection of the preferred embodiment is described in more detail below.

The JVM further includes a just-in-time (JIT) compiler 190. This forms machine code to run directly on the native platform by a compilation process from the class files. The machine code is created typically when the application program is started up or when some other usage criterion is met, and is then stored for future use. This improves run-time performance by avoiding the need for this code to be interpreted later by the interpreter 156.

Another component of the JVM is the stack area 195, which is used for storing the stacks 196, 198 associated with the execution of different threads on the JVM. Note that because the system libraries and indeed parts of the JVM itself are written in JAVA, and these frequently use multi-threading, the JVM may be supporting multiple threads even if the user application 50 running on top of the JVM contains only a single thread itself.

It will be appreciated of course that FIG. 2 is simplified, and essentially shows only those components pertinent to an understanding of the present invention. Thus for example the heap may contain thousands of JAVA objects in order to run JAVA application 50, and the JVM contains many other components (not shown) such as diagnostic facilities, etc.

Figure 3:
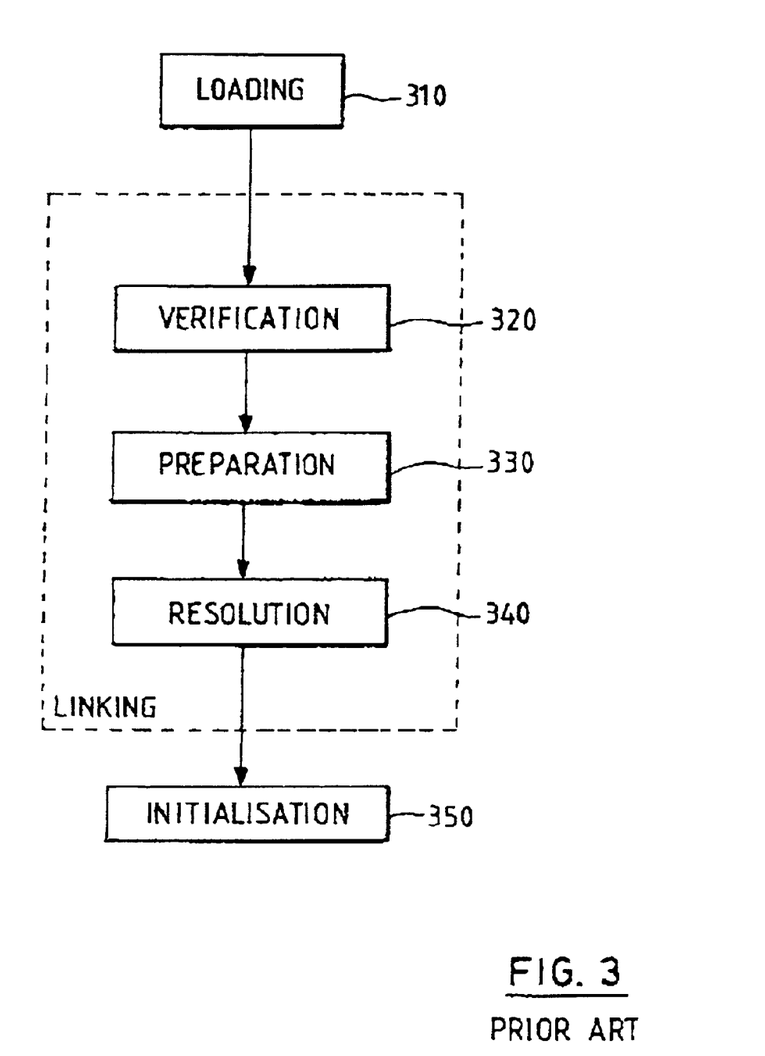
FIG. 3 is a flowchart depicting the steps required to load a class and prepare it for use.

FIG. 3 is a flowchart illustrating the operations conventionally performed to load a class in order to run a JAVA application. The first operation is loading (step 310) in which the various class loaders try to retrieve and load a particular class. The next operation is linking, which comprises three separate steps. The first of these is verification (step 320), which essentially checks that the code represents valid JAVA programming, for example that each instruction has a valid operational code, and that each branch instruction goes to the beginning of another instruction (rather than the middle of an instruction). This is followed by preparation (step 330) which amongst other things creates the static fields for a class. The linking process is completed by the step of resolution, in which a symbolic reference to another class is typically replaced by a direct reference (step 340).

At resolution the JVM may also try to load additional classes associated with the current class. For example, if the current class calls a method in a second class then the second class may be loaded now. Likewise, if the current class inherits from a superclass, then the superclass may also be loaded now. This can then be pursued recursively; in other words, if the second class calls methods in further classes, or has one or more superclasses, these too may now be loaded. Note that it is up to the JVM implementation how many classes are loaded at this stage, as opposed to waiting until such classes are actually needed before loading them.

The final step in FIG. 3 is the initialisation of a loaded class (step 350), which represents calling the static initialisation method (or methods) of the class. According to the formal JVM specification, this initialisation must be performed once and only once before the first active use of a class, and includes things such as setting static (class) variables to their initial values (see the above-mentioned book by Lindholm and Yellin for a definition of "first active use"). Note that initialisation of an object also requires initialisation of its superclasses, and so this may involve recursion up a superclass tree in a similar manner to that described for resolution. The initialisation flag in a class object 145 is set as part of the initialisation process, thereby ensuring that the class initialisation is not subsequently re-run.

The end result of the processing of FIG. 3 is that a class has been loaded into a consistent and predictable state, and is now available to interact with other classes. In fact, typically at start up of a JAVA program and its concomitant JVM, some 1000 objects are loaded prior to actual running of the JAVA program itself, these being created from many different classes. This gives some idea of the initial delay and overhead involved in beginning a JAVA application.

As part of the loading operation of FIG. 3, it is necessary to implement the loading constraints discussed above. As part of this process, the JVM records (in its internal cache) during class loading that a particular loader is an initiating loader of a particular class. The JVM then checks to see if any loading constraints are violated; if so, an error is thrown, and the loading operation fails. Likewise, after a new loading constraint is imposed (again as part of class loading) the JVM must immediately check to see if any loading constraints are violated. If so, the newly imposed loading constraint is retracted, an error is again thrown, and the relevant class loading operation fails. Note that generally such constraints only need to be confirmed during a class loading (or linking) operation.

Considering this in more detail, a new class loader constraint is created by a JVM in the preferred embodiment in the following situations:

(a) when a CONSTANT_MethodRef item is resolved in the constant pool, a check is made for all class references in the method signature (both arguments and return values). If the class that owns the constant pool and the class that defines the method have not been loaded by the same class loader, a loader constraint is created. For example, if the class that owns the constant pool is C1 and has been loaded by class loader L1, the class that defines the method is C2 and has been loaded by class loader L2, and the class that is referenced in the method signature is C, then a constraint is created between class loaders L1 and L2 with respect to class C.

(b) when a CONSTANT_InterfaceMethodRef item is resolved in the constant pool, the same method signature checks are performed.

(c) when a CONSTANT_FieldRef item is resolved and the field is a reference type (i.e. specifies a class), a constraint check is performed. If the class that owns the constant pool and class that owns the field were not loaded by the same class loader, a loader constraint is created. As an example of this, if the class that owns the constant pool is C1 and has been loaded by class loader L1, the class that owns the field is C2 and has been loaded by class loader L2, and the class that is referenced in the field is C, then a constraint is created between class loaders L1 and L2 with respect to class C.

(d) when a virtual method table for a class is constructed, any superclass methods overridden by the subclass are subject to the same method signature checks. The dependency checks take place between the newly created class and the class that defined the overridden method, which might not necessarily be the direct superclass. This is because the method signatures of the superclass and overriding class must match in order for the overriding to be performed correctly.

(e) when the interface method table is constructed. Each method that is an implementation of an interface undergoes a signature check. The dependencies are between the class loader that defines the interface class and the loader that defines the implementing class.

The above criteria lead to the possibility of multiple constraint couplings. For example, a constraint may be created for Class C between class loaders L1 and L2, and at a later time a constraint may be defined for the same class between class loaders L2 and L3. This implies a further constraint is also required in relation to Class C between class loaders L1 and L3.

Traditionally, JVM implementations have managed class loader constraints as symmetric groupings of class loaders, not taking into account the initiating/defining class loader relationships. The hierarchy of class loaders discussed earlier can generate different logical relationships between loaders that create this constraint coupling.

One example of such a relationship is a linear relationship, in which class C is defined by loaders with a direct parent-child relationship. Consider a class loader L1 as the initiating loader, and assume that it has an interface-level constraint on class C with two other class loaders, L2, L3, with L1 having a parent child relationship with each of L2 and L3. Often these constraints will be established before class C has actually been resolved by any of the three class loaders (i.e. it has not yet been physically loaded). This means that there are still two possible arrangements for the hierarchy of L1, L2 and L3:

L1—>L2—>L3 OR L1—>L3—>L2

From the pattern of constraint additions, it is not possible to determine the logical hierarchy of the parent class loaders (although for a subset of classloaders, the concrete class loaders introduced in JAVA 2, the hierarchy can be deduced by examining the parent field of the class loader). In other words, it is not feasible to determine which of the above two patterns is a true representation of the actual situation. (Note that in either case, there may be one or more intervening class loaders between the 3 class loaders shown). It is only possible to determine the ordering after the class has been loaded, in that the loading class loader must be the one at the extreme right of the chain (otherwise the class would not be accessible to the other two class loaders in the chain). In other words, the pattern on the left above represents L3 as the loading class loader, and the pattern on the right represents L2 as the loading class loader.

Another possibility for a 3-way constraint coupling is via a sibling relationship, in which two initiating class loaders L1 and L3 create constraints with a common parent class loader. These class loaders are logically detached from each other, only having the constraint dependency with the common parent L2. Graphically this can be represented by:

L1 i
  L2
L3 i

There are three defined roles for class loaders in the processing of type constraints., which can be illustrated in a simple linear hierarchy relationship (L1—>L2—>L3):

(a) Loading class loader—The class loader that physically loads a class file and transforms the file into a java-.lang.Class object (this can also be referred to as a defining class loader). Although a type constraint cannot be resolved until the loading or defining class loader creates the class instance, it is possible for a type constraint to be created before the required class is loaded. For the example hierarchy above, loader L3 is the defining or loading loader for class C. We denote the defining class loader with the notation LD.

(b) Requesting class loader—When a type constraint is processed, there is a directed relationship between the two class loaders. The requesting class loader is the loader that detects the need for a loading constraint. The requesting class loader is the defining class loader of the class that originates the class loading constraint (that is, owns the constant pool that references a class defined by another class loader). The requesting class loader will not be the defining class loader for the class that will be constrained between the two class loaders. For the example above, let us assume that class loader L1 defines class C1, which overrides method M1 of class C2, defined by class loader L2. The method signature of M1 contains a reference to class C, which causes a type constraint to be created. In this situation, L1 is the requesting class loader for class C. We denote the requesting class loader with the notation LR.

(c) Providing class loader—The providing class loader is the other half of the type constraint pair. When class with name C is identified as a class common to two class loaders L1 and L2, the class loader L2 must be able to provide C to loader L1 via a call to L1.loadClass(C). L1 cannot be the defining class loader for class C. Class C may be defined by L2, or by a parent class loader of L2 (e.g., L3). If L2 does not directly define class C, then there must exist a requestor/provider relationship between the defining class loader of C and L2, which represents the providing class loader in the above example. We denote a providing class loader with the notation LPn, where n is a positional counter for the provider chain, counting from the requesting loader to the defining loader.

Figure 4:
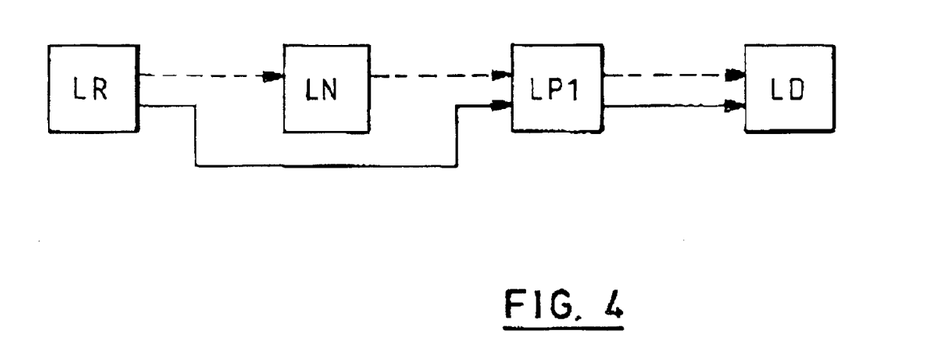
FIG. 4 illustrates a hierarchy of class loaders involved in a constraint relationship.

The principle underlying the approach adopted herein is the directed graph relationship between the requesting class loader and the defining class loader. In every type constraint situation, there is a single path from the requesting class loader to the defining class loader. This path may pass through additional intermediary providing class loaders to arrive at the final defining loader. However, the path is not necessarily the entire chain of class loaders in the hierarchy between the requesting loader and the defining loader; some loaders in the hierarchy can be skipped because they do not have any dependency on class C in relation to the requesting class loader. Such non-constrained class loaders in the hierarchy can be denoted by LN. Thus the path hereby defined is the set of class loaders with which the requesting loader has a type constraint relationship for a given class C. An example of such a relationship is shown in FIG. 4, where the dashed lines represent the class loader hierarchy, and the continuous lines link the class loaders directly involved in the constraint relationships.

Note that the requesting class loader does not necessarily have an explicit constraint between it and the defining class loader, but there is an implicit constraint that results from the close coupling between a loader that resolves a class and the loader that defines the same class.

The directed graph nature of the constraint relationships allows some simplification of the tracking of the type constraints. If the constraint information is described as a link between a class loader and parent class loaders in its loading hierarchy, the set of constraint couplings is significantly reduced. A typical case requires just a single level of constraint tracking. For example, if a requesting class loader LR has constraint relationships for class C1 to loaders LP1 and LP2, and loader LP1 has a constraint relationship to loader LP2 for the same class C1, then it is only necessary for loader LR to track the relationship to LP1, its closest ancestor in the loader hierarchy.

Tracking of the constraint relationships is only necessary until one of the participating loaders has resolved the class in question. Once this is detected, it is only necessary for the requesting loader to keep a reference for the resolved class to verify the result when the same class is resolved by loader LR. Once the class is resolved for any of the linked class loaders, the answer is predetermined for the rest of the loaders involved in the constraint.

The type constraint checking mechanism of the preferred embodiment merges the roles of the internal class loader cache and the prior art type constraint table. An entry in the internal cache holds a reference to a class resolved by another class loader (referred to as the constrained class). The internal cache entry also contains a list of pointers to cache entries defined by other class loaders. These cross loader references are created to identify unresolved type constraints between two loaders. Normally, only a single link is required, but it is possible to construct loader scenarios where more than one unresolved relationship exists. Wherever possible, this single reference situation is maintained by shifting constraint relationships up additional class loader parent levels. The constraint information is updated when new constraints are identified and when a resolved class is added to the requesting class loader's internal cache.

The algorithm for updating the constraints will now be described.

1. Adding Type Constraints (i) resolve the internal cache entries for both the requesting loader LR and the providing loader LP. In either loader, if the class has not been resolved, a place holder cache entry is inserted into the cache. This entry will not yet have a reference to a real class, so internal cache searches will fail to locate a class.

(ii) if loader LR has already resolved this class or is holding a reference to a constrained class, perform a consistency check with the entry in loader LP's cache. A mismatch results in the defined java.lang.LinkageError exception. If the consistency check passes, the constrained class information is propagated to the LP class
loader. This may result in the constraint getting propagated to multiple levels of class loader.

(iii) if loader LR has not resolved the class nor identified the constrained class, but loader LP has resolved the class or been constrained, the resulting class object is added as the constrained class in the cache entry for loader LR. From this point, LR only needs to do consistency checks with other loaders and potentially propagate constraint information as in step
(ii) above.

(iv) if the target class is still unknown to both the LR and LP, a link is made from the cache entry in loader LR to the cache entry in loader LP. This is a pending constraint. The pending constraints are processed when a) a new constraint is added, and b) the LR class loader finally resolves the target class. For step a), the consistency check with pending links is performed between steps (i) and (ii) above. Note that when this consistency check is performed, this may result in the constrained class value of LR's cache entry getting updated if one of the pending links has resolved this entry. There is no need to propagate resolved information up the chain yet, since a pending link will only exist if LR's entry is still
unresolved. When a new pending link is identified, a check is first made to see if any existing pending links originate from this class cache entry. If the entry is already linked to this cache entry, or the new linked entry can be reached by following the chain of references in an existing link, there is no need to add this item as a direct link from this entry. The parent-child relationships of the other class loaders will ensure the constraint is properly enforced. Similarly, if it is possible to reach an existing link item by following a reference chain from the new link item, the existing item link can replace the already existing one. Multiple links from a cache item are only necessary if there are broken links in the constraint chain leading from the requesting loader to the terminal defining class loader. Broken links are only possible with a fairly long class loader hierarchy, and normally one of the parent loaders will have already resolved the class in question, eliminating the need for the links entirely.

(v) if any of the above steps filled in the constrained class value in the LR cache entry, this information needs to be propagated to any pending constraint links. Once this is propagated, the links are deleted, since all of the caches are now tagged with the target class they must resolve to.

Note that the distinction between a resolved internal cache entry and a constrained internal cache entry must be maintained. Once the cache entry is constrained, the end result of resolving the class has been dictated. However, the resolution process cannot be bypassed, otherwise the security checks to determine if the class can be loaded by
a class associated with the requesting loader will be improperly bypassed.

2. Updating the class cache

When a requesting class loader finally resolves a named class, its internal class entry is updated with the identity of the resolved class. When the class is added to the internal cache, constraint consistency checks must be performed. The internal cache entry will be in one of four possible states:

(a) Resolved—The class has already been resolved by this class loader, and the resolved class is not the same as the new class. This is a class redefinition error, rather than a class constraint problem.

(b) New—This is a first time reference to this class by the loader. No previous dependencies on other loaders have been identified, and no other loader has a linked dependency to this loader. The entry is just made resolved without further processing.

(c) Constrained—A constraint dependency has been determined by prior processing. The constrained class entry and the newly resolved class must be the same class object, otherwise this is a LinkageError exception. A constrained cache entry does not have any pending links to other class loaders for this class. Other class loaders may have pending links to this cache entry still active.

(d) Pending—The constrained class identity is still undetermined, and this cache entry still has links to entries in parent class loaders. The pending links are first processed to resolve a potential constrained class. If this entry is linked to the defining class loader's cache entry (very likely), the constraint will be determined. A link to a providing class loader has a fairly high probability of resolving this information also. After processing the pending links, the target cache entry has either reverted to constrained state, and will be processed according to the rules above, or is still in pending stage. If the entry still has pending links, the cache entry is made resolved, and the resolved class is propagated to each of the pending chains as a constrained class. The pending links are then deleted.

Once the cache entry has been updated, it is no longer necessary to maintain links to other class loaders for this class. Once this state, has been reached, it is only necessary to ensure that the constrained class information is propagated to parent loaders when additional method and field signatures are processed.

Figure 5:
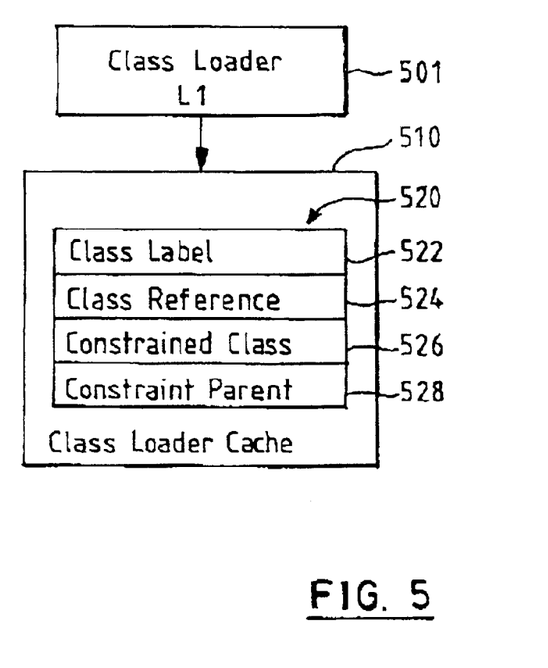
FIG. 5 illustrates a data structure used for storing constraint information in a class loader cache in a preferred embodiment of the invention.

FIG. 5 illustrates an entry in the class loader cache for the handling constraints in a preferred embodiment of the present invention. In particular, class loader cache 510 is associated with class loader L1 (501). Within the class loader cache is a data structure 520 for storing information about a particular class instance, including constraint information for a constraint associated with that class instance. Generally there will
be multiple examples of such data structures in any given class loader cache. Each structure 520 includes four data fields 522–528, whose purpose will be described in more detail below, and whose value will normally be set to null unless otherwise indicated. (Note that other information is stored in the data structures about class instances, but this has been omitted from FIG. 5 as not relevant for an understanding of the present invention).

Figure 6A:
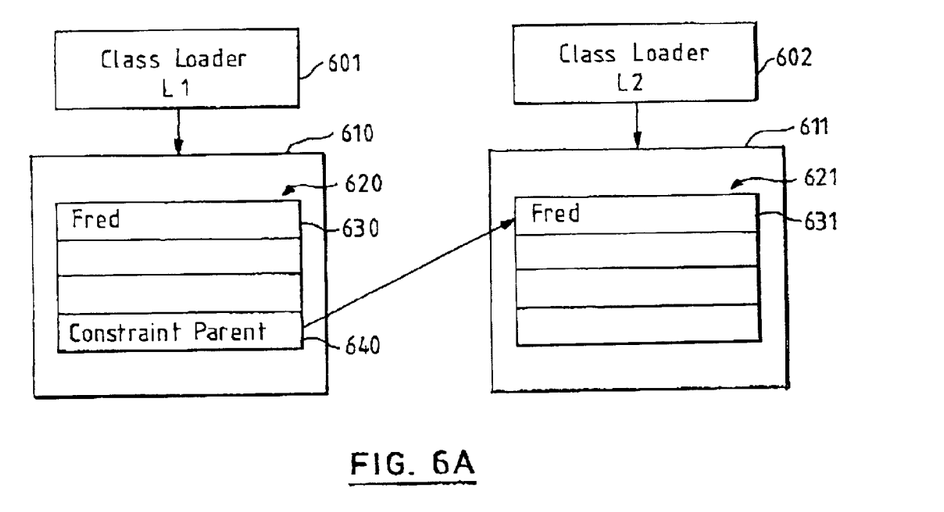
FIGS. 6A–6E illustrate the state of the data structure of FIG. 5 at various stages in monitoring a class loader constraint.

With reference now to FIG. 6A, it is assumed that two classes, say classes C1 and C2 loaded by class loaders L1 and L2 respectively both reference a class "Fred", with L1 as the requesting loader and L2 as the providing loader. This leads to the requirement for a type constraint, which is typically detected as the system attempts to call the relevant method in C1 that triggers the constraint. Assuming for the moment that after searching for Fred in the internal caches of both L1 and L2, neither has yet resolved Fred. Therefore, the system creates a so-called dummy entry in the internal cache for each of L1 and L2 ("dummy" because it does not yet actually identify the true location of Fred). For L2 the dummy entry 621 simply contains the identifier "Fred" in the class label field (see 522 in FIG. 5). The corresponding class label field 630 in the constraint data structure 620 in internal cache 601 for FIG. 6A likewise contains the value Fred. However, data structure also contains an additional value in the constraint parent field 620, which points to the data structure 621 for that constraint in the internal cache 611 of class loader L2. Notice therefore that this reflects the asymmetric relationship between a requesting class loader (L1) and a providing class loader (L2), and that L2 must be a direct or indirect parent of L1.

At some point in the future, it is assumed that loader L1 is asked to resolve the class "Fred". It therefore delegates the call up the loader hierarchy, which returns an actual class loader object for the "Fred" class. When the cache is updated with this new information, the constraint entry 620 is discovered. In particular, the existence of constraint parent pointer 640 means that there is a need to check this class object for L1 against the parent one for L2. The cache entry for L2 can be in a couple of different states at this point.

Firstly, it can be unchanged from the state shown in FIG. 6A. This means L2 could not be the loader that physically loaded the "Fred" class (perhaps it was loaded by loader L3, and L2 has not had to resolve this yet), and as yet there can be no constraint violation. Consequently, L1 updates its class reference field 524 to indicate that it has now resolved the class. In addition it fills in the "constrained class" field 526 in the constraint entry 621 for Fred in the internal cache 611 for L2. Note that the constraint parent field 640 is now reset to null, since it is no longer necessary to track the constraint relationship
per se, only to ensure that when L2 does load Fred, that this resolves to the same class as for L1.

Figure 6B:
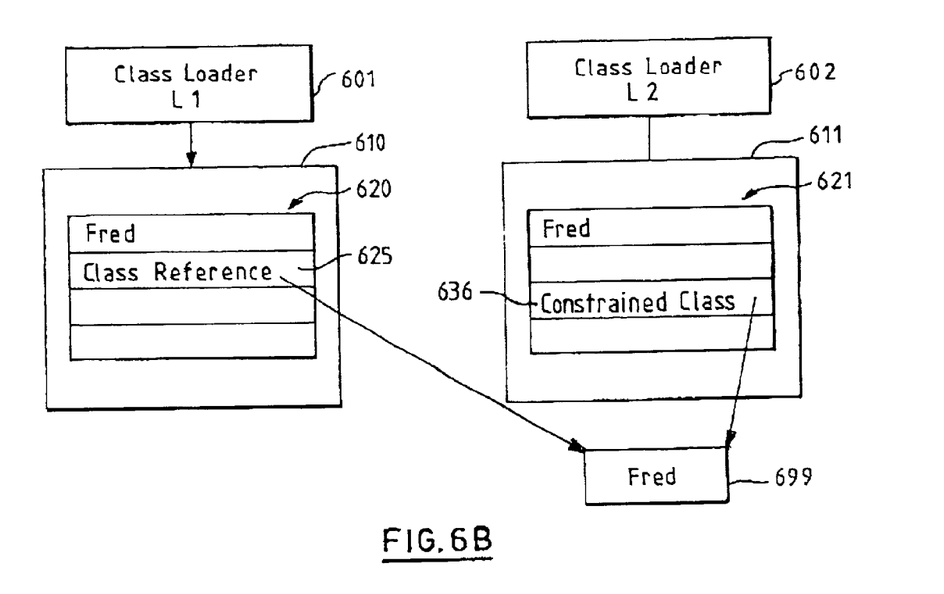

The resulting situation is shown in FIG. 6B, where block 699 represents the loaded class Fred. This is directly referenced by field 625 in the cache of loader L1, thereby allowing L1 in the future to know in that it has already resolved Fred. The class Fred is also referenced by the constrained class field 636 in the entry 621 for this constraint in the internal cache of L2. Consequently, when L2 is finally asked to load this class, it duly obtains a reference to class Fred 699. It must then check to see if it has anything in the "constrained class" field before updating its own class reference entry. If it does, then the value in this field 636 must be the same as the reference that it has just obtained for resolution, otherwise there is a type constraint violation and a constraint violation error is returned.

Figure 6C:
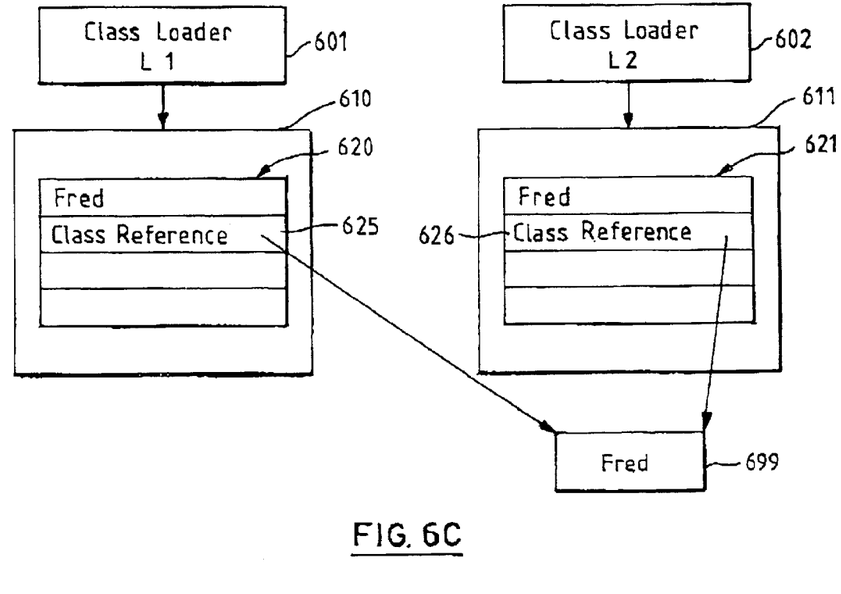

Assuming that the two references do match, this leaves the situation shown in FIG. 6C, where each class loader sees Fred as being successfully resolved. Each entry in the class loader caches 620, 621 essentially now just contains a reference 625, 626 to Fred, and the information about constrained class in the L2 cache can be deleted as it is no longer required. This marks the end of the constraint checking between L1 and L2 in relation to Fred, since it is now ensured that they are indeed referencing the same class object.

Figure 6D:
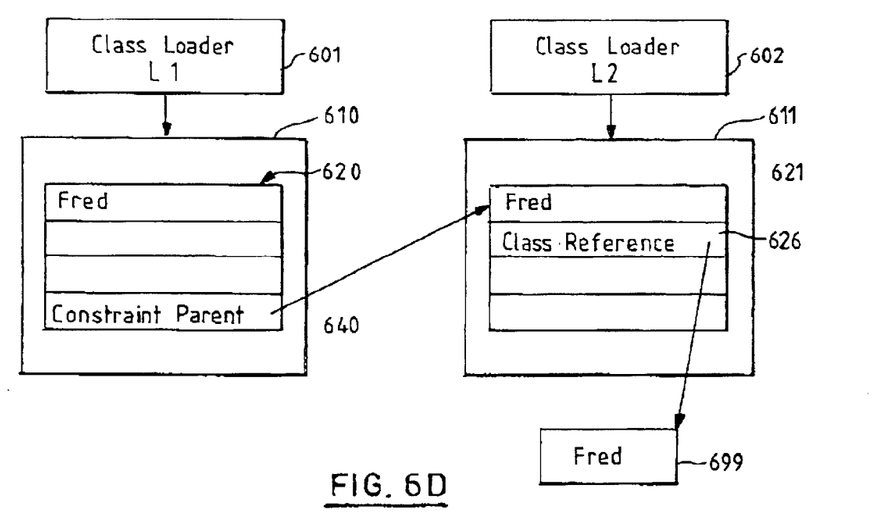

An alternative possibility is that when L1 comes to resolve Fred, that this class has already been resolved by L2. This situation is illustrated in FIG. 6D, which is updated from FIG. 6A in that class Fred is now loaded 699, and the class reference 626 in the internal cache 611 for loader L2 has been altered to point to Fred. Now when L1 tries to resolve Fred, it must ensure that it obtains the same class reference as stored within field 626 within the internal cache for L2, otherwise the constraint is violated. Note that L1 knows to perform this check because the constraint parent field 640 is set for its own cache entry for Fred 620, and points to the cache entry for Fred for L2. Assuming that the correct class reference is obtained by L1, it can update its own internal cache accordingly, which would lead again to the end result of FIG. 6C (which represents the end result for all successful scenarios).

There are also two other possible initial conditions for this process, at the time when the need for the constraint is originally detected. Firstly, L1 may have already resolved the class (Fred), but L2 has not. In this situation a dummy entry is created in L2 for "Fred", and the "constrained class" field 636 is filled in. This now looks like FIG. 6B above, and the processing then follows as previously described through to FIG. 6C.

Figure 6E:
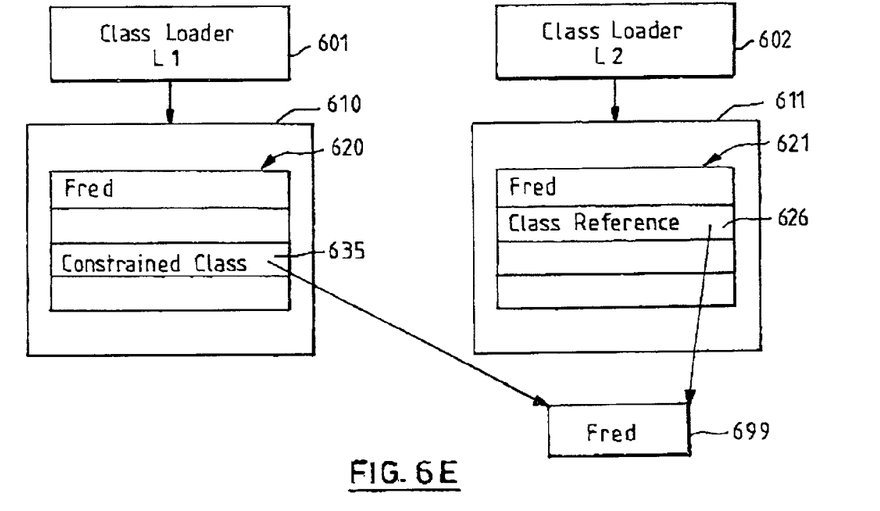

In the other initial condition, L2 may have already resolved the class, and L1 has not resolved it yet (this is a very common situation). In this situation, shown in FIG. 6E, the internal cache entry 621 for Fred for L2 will contain a reference 626 to loaded class Fred 699. This value can then be copied into the constrained class field 635 in a dummy entry which is added to the L1 cache entry 620 for this constraint. Subsequently, when L1 does resolve Fred, it will compare the result with the value in this constrained class field 635, and flag a constraint violation if these do not match.

(One other final possibility of course is that both L1 and L2 have already resolved Fred, but in this situation a check can immediately be performed to see if they agree on the results of the resolution, without the need to monitor for some future possible constraint violation).

Figure 7:
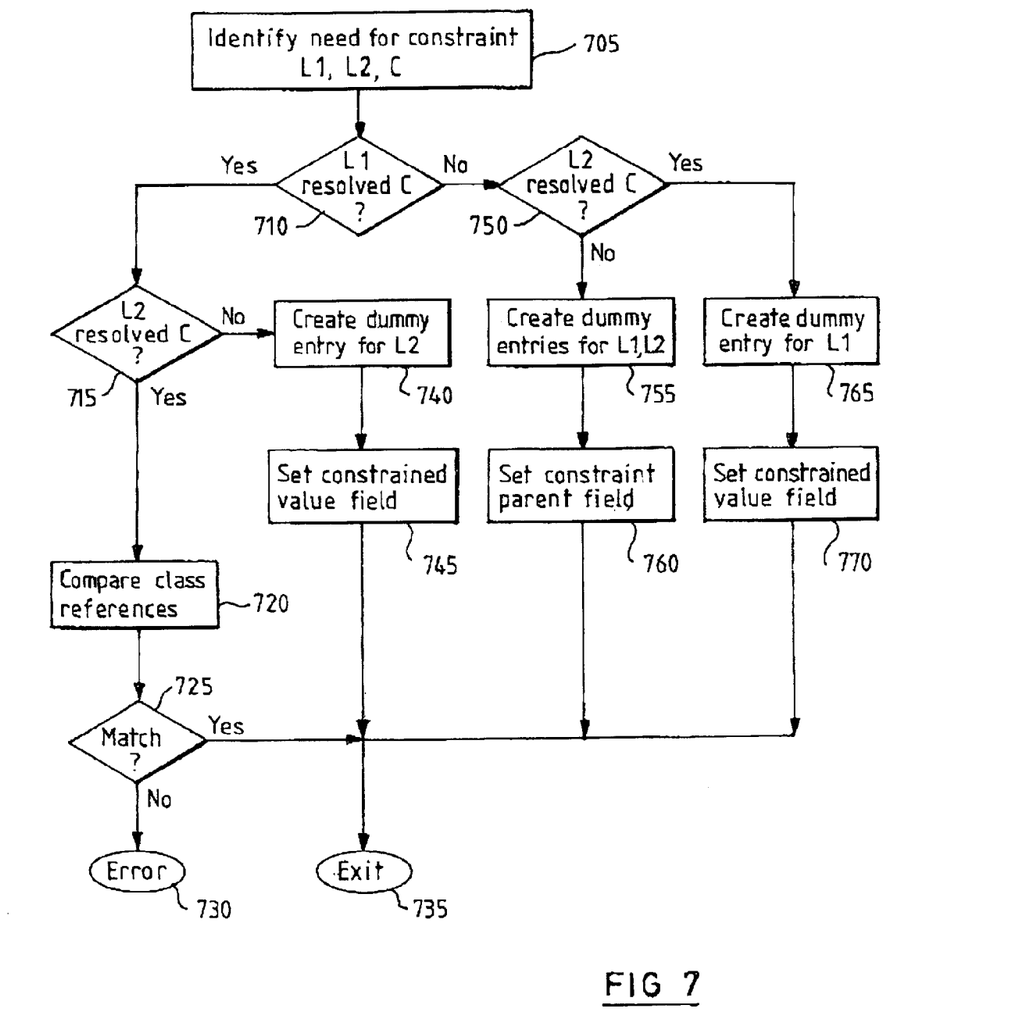
FIG. 7 is a flowchart depicting the steps performed on identifying a class loader constraint in accordance with a preferred embodiment of the invention.
Figure 8:
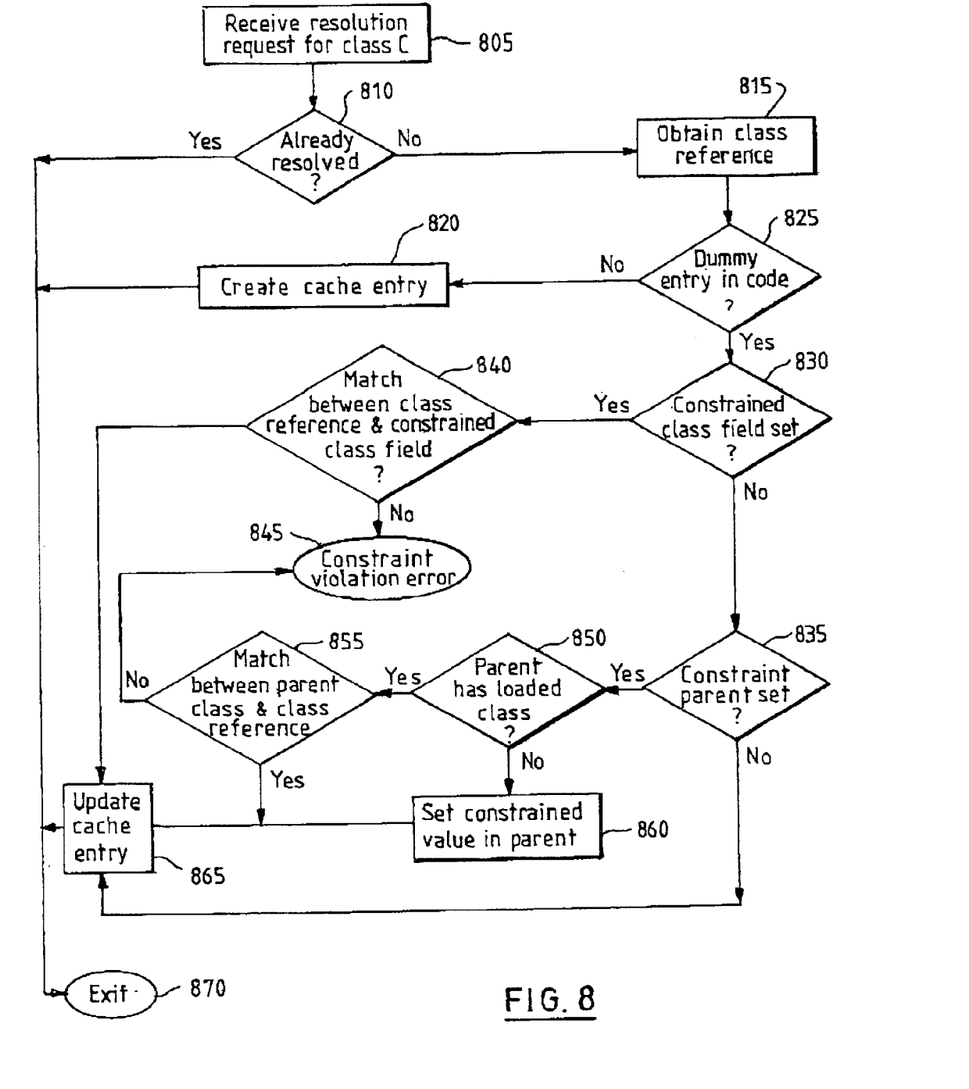
FIG. 8 is a flowchart depicting the steps performed on resolving a class in accordance with a preferred embodiment of the invention.

The above processing is illustrated in the flowcharts of FIG. 7 and FIG. 8. The processing of FIG. 7 is triggered by the identification of a type constraint between class loaders L1 and L2 in respect of class C (step 705). Thus a test is first made to see if L1 has already resolved C (step 710), and if so, a further test is made to see if L2 has already resolved C (step 715). If this is again positive, the class references obtained by L1 and L2 for C are compared to ensure that they are identical (step 725). If they match, then the method successfully exits (step 735), otherwise a constraint violation error has been identified (step 730). Returning to step 715, if L2 has not yet resolved C, then a dummy entry for C is created in the
internal cache of L2 (step 840), with the constrained value field in this entry being set to the class object reference obtained by L1 (step 745). The method then exits (step 745). Going back to step 710, if L1 has not already resolved C, a test is performed (step 750) to see if L2 has already resolved C. If not, dummy entries for C are created in the internal caches for both L1 and L2 (step 755), and the constraint parent field in the internal cache for L1 is set to point to the dummy entry for C in the cache for L2 (step 760). The method then exits (step 745). Alternatively, if at step 750 L2 has already resolved C, then a dummy entry is created only in the internal cache for L1 (step 765). The class object reference from L2 for C is then copied into the constrained value field for this dummy entry (step 770), and the method then exits.

FIG. 8 depicts the operations of resolving a class, and is triggered by the class loader receiving a request to resolve a class (step 805) (nb FIG. 8 only shows those operations relevant to an understanding of the present invention). A test is performed to see if this class has already been resolved (step 810); if so, the method directly exits (step 870), otherwise a reference to the class is obtained (step 815). The cache for the class loader is now examined (step 825) to see if it contains a dummy entry for the class; if not, a new cache entry for the class is created (step 820) and the method again exits (step 830). If a dummy entry is present, this indicates the
presence of a type constraint. A test is therefore made (step 830) to see if the constrained class field is present, and if so, a check is made to confirm that the class reference just retrieved matches the constrained class field (step 840). If there is no match, this results in a constraint violation error (step 845); if there is a match, the dummy entry is updated to indicate the new, successfully resolved status of the class (step 865), and the method exits (step 870). If the constrained class field is not set, then a test is made to see if the constraint
parent field is set (step 835). If not, then this must be the providing class loader, and there is no need to check the constraint at present. Accordingly, the cache entry is updated with the new class reference (step 865) and then exits (step 870). If on the other hand the constraint parent field is set, then a check is made to see whether the parent identified by this field has already resolved the class (step 850). If not, the constrained value field is set in the parent class loader (step 860), the cache for this class loader is suitably updated with the new class reference (step 865), whereupon the method exits (step 870). If the parent has already resolved the class, then a test is made to see if the class resolved by the parent matches newly obtained class reference (step 855). A negative result here indicates a constraint violation error (step 845), whilst a positive result would be followed by updating of the class loader cache with the new reference (step 865), and then exit (step 870).

The examples shown in FIGS. 6A–6E, and the flowcharts of FIGS. 7 and 8, describe a situation with only two loaders, although the principles can be readily extended to a larger number of loaders (leading to chains of constraint parent links as discussed early). The resulting processing is somewhat more involved, although a logical extension of that previously described. For example, a class loader could in theory be a requesting class loader with respect to a class vis-a-vis one class loader, and a providing class loader with respect to the same class loader vis-a-vis a different class loader. This would mean that potentially the constrained class field and constraint parent field could both be set in the same dummy entry. Consequently the processing of FIG. 8 would have to be modified, in that the processing associated with steps 830 and 835 would both have to be performed after a positive result to step 825 (not either-or as in a two class loader situation).

In practice two-level relationships are most common. Thus generally at least one loader in the possible pairings will have resolved the class, resulting in a situation such as FIG. 6E, with class "Fred" having multiple "constrained class" fields pointed to it.

The algorithm described herein for managing type constraints has the following advantages over the traditional approaches:

(i) Improved efficiency achieved through a reduction in the number of table searches, reduced storage requirements, and better locality of reference characteristics.

(ii) Improved scalability in multi-processor environments. The removal of the single constraint table for the JVM allows both more granular locking of the data structures, as well as atomic style control block updates that remove the locking requirement for read access to cache control blocks.

(iii) Enablement of shared classes. In the single table constraint approach, a requesting class loader needed to have awareness of both class loaders it was dependent upon, but also knowledge of what class loaders were also dependent on the requesting loader. Using this algorithm cache entries can make links to tables stored in memory shared between JVM instances without other JVMs needing to know of its existence.

The skilled person will be aware of many possible variations on the embodiment described above. The invention has been described primarily in relation to a JAVA virtual machine in a server environment, but it will be understood that it applies to any other language with similar properties (possibly C# from Microsoft Corporation), and is also applicable to the client embodiment, particularly when it is desirable to have a quick start-up of applications. In addition, many of the details of the systems and processes utilised are exemplary only, and can be varied according to particular circumstances. Thus other modifications to the embodiments described herein will be apparent to the skilled person yet remain within the scope of the invention as set out in the attached claims.

What is claimed is:

1. An object-oriented computer system, including:
   two or more class loaders for loading program class files into the system; and
   a constraint checking mechanism so that where a first class file loaded by a first class loader makes a symbolic reference to a second class file loaded by a second class loader, said symbolic reference including a descriptor of a third class file, the constraint enforces that the first and second class files agree on the identity of the third class file;
   said constraint checking mechanism including means for;
   creating a first constraint data structure in an internal cache associated with said first class loader and a second constraint data structure in an internal cache associated with said second class loader; and
   recording a constraint, in said first constraint data structure associated with said first class loader, as an asymmetric relationship between said first and said second class loaders;
      wherein said first constraint data structure associated with said first class loader comprises;
         a first parameter denoting said third class file, which is identified by said descriptor in said symbolic reference; and
         a second parameter denoting said second class loader, which loaded said third class file.

2. The system of claim 1, wherein said first constraint data structure further includes a third parameter denoting an object reference to said third class file which is identified by said descriptor in said symbolic reference, as loaded by said first class loader with which said first constraint data structure is associated.

3. The system of claim 2, wherein said first constraint data structure further includes a fourth parameter, denoting the object reference to said third class file which is identified by a said descriptor in said symbolic reference, as loaded by said second class loader which loaded said third class file.

4. The system of claim 3, further comprising means for comparing said third and fourth parameters, to identify a constraint violation if they do not match.

5. The system of claim 2, further comprising means for copying said third parameter into said constraint data structure associated with said second class loader which loaded said third class file.

6. A method of operating an object-oriented computer system, including two or more class loaders for loading program class files into the system and a constraint checking mechanism so that where a first class file loaded by a first class loader makes a symbolic reference to a second class file loaded by a second class loader, said symbolic reference including a descriptor of a third class file, the constraint enforces that the first and second class files agree on the identity of the third class file, said method comprising the steps of:
   identifying the need for a constraint between said first and second class loaders in respect of said third class file;

creating a data structure for each of said first and second class loaders; and setting a pointer from the data structure for the first class loader to the data structure for the second class loader to identify the latter as being the constraint parent.

7. The method of claim 6, wherein the data structure for each of said first and second class loaders is stored in a cache associated with the respective class loader.

8. The method of claim 6, further comprising the steps of:

resolving said third class file to a first object reference by the first class loader;

copying the first object reference from the third class file to the data structure for the second class loader;

resolving said third class file to a second object reference by the second class loader; and checking that said first and second object references are identical to ensure that said constraint has not been violated.

9. The method of claim 6, further comprising the steps of:

resolving said third class file to a first object reference by the second class loader;

resolving said third class file to a second object reference by the first class loader; and responsive to detecting that said pointer is set, checking that said second and first class references are identical to ensure that said constraint has not been violated.

10. A method of operating an object-oriented computer system, including two or more class loaders for loading program class files into the system and a constraint checking mechanism so that where a first class file loaded by a first class loader makes a symbolic reference to a second class file loaded by a second class loader, said symbolic reference including a descriptor of a third class file, a constraint enforces that the first and second class files agree on the identity of the third class file, said method comprising the steps of:

providing a data store for recording the asymmetric constraint between said first and second class loaders in respect of said third class file;

resolving a reference to said third class file by said first class loader;

identifying from the data store the existence of said constraint between said first and second class loaders in respect of said third class file; and updating the data store to indicate the reference to said third class file as resolved by the first class loader.

11. The method of claim 10, wherein said data store comprises a first data structure in a cache associated with the first class loader, and a second data structure in a cache associated with the second class loader.

12. The method of claim 11, wherein the recording of an asymmetric constraint comprises a pointer from said first data structure to said second data structure.

13. The method of claim 11, wherein said step of updating comprises updating said second data structure with the reference.

* * * * *